US007343777B2

(12) United States Patent
Cordani

(10) Patent No.: US 7,343,777 B2
(45) Date of Patent: Mar. 18, 2008

(54) STRIKING MEMBER VIBRATION MEASUREMENT DEVICE

(76) Inventor: Andrew Cordani, 1 Lynwood Road, Tooting, London (GB) SW17 8SB ( * ) Notice: Subject to any disclaimer, the term of this patent is extended or adjusted under 35 U.S.C. 154(b) by 76 days.

(21) Appl. No.: 10/561,678

(22) PCT Filed: Jun. 24, 2004

(86) PCT No.: PCT/GB2004/002746

§ 371 (c)(1),
(2), (4) Date: Dec. 21, 2005

(87) PCT Pub. No.: WO2005/001810

PCT Pub. Date: Jan. 6, 2005

(65) Prior Publication Data

US 2006/0283233 A1 Dec. 21, 2006

(30) Foreign Application Priority Data

Jun. 24, 2003 (GB) ................................ 0314712.1

(51) Int. Cl.
*G01M 7/00* (2006.01)

(52) U.S. Cl. .................................................... 73/12.01

(58) Field of Classification Search ................ 73/12.01
See application file for complete search history.

(56) References Cited

U.S. PATENT DOCUMENTS 4,069,706 A * 1/1978 Marshall et al. .............. 73/666
4,904,222 A 2/1990 Gastgeb et al.
5,062,341 A 11/1991 Reiling et al.
5,157,213 A 10/1992 Kashio et al.
5,293,000 A * 3/1994 Adinolfi ...................... 84/730
5,328,185 A * 7/1994 Finnigan et al. ............ 473/294
5,585,567 A * 12/1996 Van Manen ................. 73/702
6,347,542 B1 * 2/2002 Larsson et al. ............ 73/12.12
6,722,201 B2 * 4/2004 De Baerdemaeker et al. 73/627

FOREIGN PATENT DOCUMENTS

EP 0 444 919 A1 9/1991
GB 2 183 076 A 5/1987

* cited by examiner

*Primary Examiner*—Max Noori
(74) *Attorney, Agent, or Firm*—Lerner, David, Littenberg, Krumholz & Mentlik, LLP

(57) ABSTRACT

A resonance and/or vibration measurement device has a resonance and/or vibration measuring device adapted to be fitted to an elongate member with which the device is to be used. A processing device is connected to the resonance and/or vibration measuring device in which the resonance and/or vibration measuring device records resonance and/or vibration of the elongate member with which it is used caused by the striking of a material in use. The processing device is adapted to identify a pre-determined characteristic of the material from the recorded resonance and/or vibration measurement.

19 Claims, 1 Drawing Sheet

STRIKING MEMBER VIBRATION MEASUREMENT DEVICE

CROSS-REFERENCE TO RELATED APPLICATIONS

The present application is a national phase entry under 35 U.S.C. § 371 of International Application No. PCT/GB2004/002746 filed Jun. 24, 2004, published as WO 2005/001810 on Jan. 6, 2005, which claims priority from United Kingdom Application No. 0314712.1 filed Jun. 24, 2003, all of which are incorporated herein by reference.

BACKGROUND OF THE INVENTION

This invention relates to a resonance and/or vibration measurement device, for use particularly, but not exclusively with a drum stick.

Drum sticks are traditionally used to strike the surface of a drum, which then resonates and makes a sound. However, with the advance of technology a number of electric or electronic alternatives have been suggested.

It is known to provide a transducer sensor which when struck with a drum stick causes an electronic sound to be created by an associated amplifier. Another known alternative is to provide a motion sensor or accelerometer inside a mock drum stick, which causes an electronic sound to be created by an associated amplifier inside the stick when the stick is struck against any surface.

Both of these arrangement suffer from drawbacks. The transducer sensor to be struck is a complex piece of equipment which can be expensive to build and to purchase. In addition, it must be transported with the drum sticks. However, a real drum stick can be used with these systems, which is preferred by drummers.

The mock drum stick is not popular because it does not feel or respond like a real drum stick, due to the added components, and has only been successfully created as a novelty item. Although, it does benefit from being a stand-alone device which is easy to transport.

SUMMARY OF THE INVENTION

The present invention is intended to overcome some of the above problems by providing a novel approach.

According to the present invention a resonance and/or vibration measurement device comprises an elongate member, resonance and/or vibration measuring means and processing means, in which the resonance and/or vibration measuring means records resonance and/or vibration of the elongate member caused by the striking of a material in use, and the processing means is adapted to identify a pre-determined characteristic of the material from the recorded resonance and/or vibration measurement.

The device is intended to measure the reaction of the elongate member caused by the striking of the material in use. This reaction may be in the form of a vibration or reverberation whereby the body of the elongate member moves rapidly back and forth, or it may be in the form of resonance whereby the material resonance of the elongate member is disturbed such that it oscillates or vibrates. The nature of the reaction of the elongate member depends on how hard or dense the material is which is struck, and how hard the elongate member strikes it.

Preferably the processing means can be provided with a programmable database. Further the processing means can be adapted to identify a pre-determined characteristic of the material struck by comparing the recorded measurement to recorded measurements stored in the database.

It will be appreciated that the device can be used for a number of purposes. In one construction the device may be used to identify a pre-determined characteristic or property of the structure of the material, for example its hardness or structural integrity. With this construction the device can be used to check the density of a wall, or other structure, or whether a component of the wall, for example a concrete layer, has set or not.

However, in a preferred construction the device can be used as a musical instrument, and the elongate member can be a drum stick.

Preferably the processing means can be further provided with signal creation means. Preferably the signal is a MIDI signal, which can be sent to a sound creation device, such as a MIDI controller or computer which can convert the signal into an audio signal, which can then be recorded or sent to an amplifier and speaker to be played out loud. The MIDI signal may also be recorded.

The resonance and/or vibration measuring means can be a transducer, an accelerometer, a microphone or any other known device which can detect resonance and/or vibration. However, in a preferred construction one or more strips of piezoelectric quartz crystal may be attached to the drum stick, and the signals created by the piezoelectric strips in use can be sent to the processing means.

The processing means can be any suitable computer program run on a computer or processor, which is capable of creating a database, referencing measurements taken with those on the database, and creating MIDI signals to be sent to the sound creation device.

Preferably the drum stick is a conventional wooden, carbon fibre, nylon or steel drum stick. The resonance and/or vibration measuring means can be embedded in the drum stick during manufacture, or it can be retrofitted to an existing drum stick.

The invention also includes a method of using a resonance and/or vibration measurement device comprising an elongate member, resonance and/or vibration measuring means and processing means, in which the resonance and/or vibration measuring means records resonance and/or vibration of the elongate member caused by the striking of a material in use, and the processing means is adapted to identify a pre-determined characteristic of the material from the recorded resonance and/or vibration measurement, and in which the processing means is adapted to be able to store recorded resonance and/or vibration measurements taken in use in a database, such that subsequent resonance and/or recorded measurements taken in use can be compared with them, and MIDI signal creation means, including the steps of:

1) Striking a material with the elongate member, causing the elongate member to resonate and/or vibrate such that a recorded measurement is taken by the resonance and/or vibration measuring means, 2) Storing the recorded measurement or one or more pre-determined characteristics of the recorded measurement, in the database, 3) Determining a MIDI signal to be associated with the material struck in step 1).

4) Repeating steps 1) to 3) a desired number of times with different materials, until a desired number of recorded measurements are stored in the database, 5) Striking any of the different materials struck with the elongate member during the performance of a step 1), causing the elongate member to resonate and/or vibrate such that a recorded measurement is taken by the resonance and/or vibration measuring means, 6) Referring the recorded measurement taken in step 5) to those stored in the database in step 2) to find a match.

7) Creating the MIDI signal determined in step 3), according to the match made in step 6).

The invention also includes a resonance and/or vibration measurement device comprising resonance and/or vibration measuring means adapted to be fitted to an elongate member with which the device is to be used, and processing means, in which the resonance and/or vibration measuring means records resonance and/or vibration of the elongate member with which it is used, which is caused by the striking of a material in use, and the processing means is adapted to identify a pre-determined characteristic of the material from the recorded resonance and/or vibration measurement.

BRIEF DESCRIPTION OF THE DRAWINGS

The invention can be performed in various ways, but one embodiment will now be described by way of example and with reference to the accompanying drawing in which.

DETAILED DESCRIPTION

Figure 1:
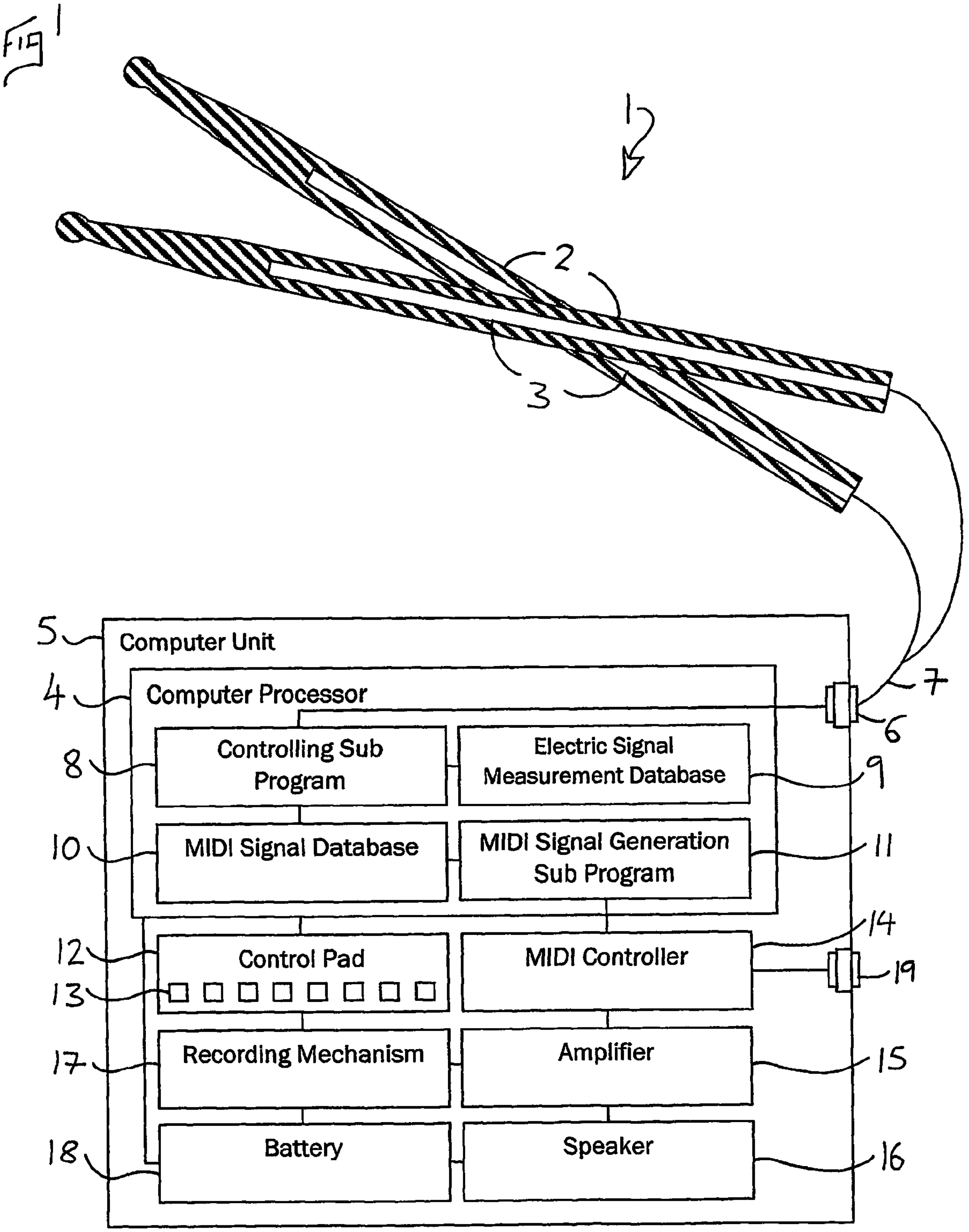
FIG. 1 is a diagrammatic view of a drum stick device according to the present invention.

In FIG. 1 a resonance and/or vibration measurement device in the form of electronic drum machine apparatus 1 comprises an elongate member, in the form of drum sticks 2 (shown in cross section), resonance and/or vibration measuring means in the form of piezoelectric quartz crystal strips 3, and processing means in the form of computer processor 4, which is housed inside a computer unit box 5.

The piezoelectric strips 3 are disposed inside the drum sticks 2, which are constructed from wood. The piezoelectric strips 3 are connected to an input jack 6 provided in the computer unit 5 by means of signal wires 7.

Input jack 6 is connected to the computer processor 4, which comprises controlling sub program 8, electric signal measurement database 9, MIDI signal database 10 and a MIDI signal generation sub program 11. The computer unit 5 is also provided with a control pad 12 provided with input keys 13, MIDI controller 14, amplifier 15, speaker 16, recording mechanism 17, battery 18 and output jack 19.

In use, one or other of the drum sticks 2 are struck against a material, such that they resonate and/or vibrate. The movement causes the piezoelectric strips 3 to flex, which creates an electric signal. The signal is sent via the wires 7 to the input jack 6, and onto the controlling sub program 8.

The controlling sub program 8 then compares the signal, or a pre-determined characteristic of the signal, to signals contained in the database 9. When a match is found, the corresponding MIDI signal designated to the incoming signal is raised from the MIDI signal database 10 and an outgoing MIDI signal is created by the MIDI signal generation sub program 11. The outgoing MIDI signal is sent to the MIDI controller, where it is either sent to the output jack 19 as a MIDI signal or an audio signal, or it is sent as an audio signal to the amplifier 15 and speaker 16 to be played, and/or the recording mechanism 17 to be stored. (The recording mechanism can be any known system.)

Accordingly a preferred method of using the drum machine apparatus 1 comprises the following steps.

1) The device 1 is switched to a "store" mode via the control pad 12.

2) One or other of the drum sticks 2 is struck against a first material, for example a wooden table top (not shown).

3) The electric signal sent from the piezoelectric strip 3 is received by the controlling sub program 8, which stores it in the electric signal measurement database 9.

4) The user then chooses a sound to be designated to the first material by accessing the MIDI signal database 10 via the control pad 12. (The user can listen to a sound before choosing it, by playing it through the speaker 16, via the MIDI signal generation sub program 11, the MIDI controller 14 and the amplifier 15. The user can therefore listen to a number of sounds, before choosing a desired one.)

5) Steps 2-4 are repeated a desired number of times with different materials being struck, for example a ceramic plate, a mouse mat or a pad of paper, with different sounds chosen to be created. (The two sticks could also be struck together to create an individual signal).

6) The device 1 is switched to a "play" mode via the control pad 12.

7) One or other of the drum sticks 2 are then struck against any of the materials struck in step 2.

8) The electric signal sent from the piezoelectric strip 3 is sent to the controlling sub program 8, where it is referenced against the signal measurements contained in the database 9.

9) When a match is found the corresponding MIDI signal designated in step 4 is sent to the MIDI signal generation sub program 11, which generates the signal and sends it to the MIDI controller 14, where it is either sent to the output jack 19 as a MIDI signal or an audio signal, or it is sent as an audio signal to the amplifier 15 and speaker 16 to be played, and/or the recording mechanism 17 to be stored.

10) Steps 7 to 9 are repeated indefinitely to create a musical sequence.

It will be appreciated that two drum sticks will not react in exactly the same way when struck against the same material. Therefore, in an alternative embodiment the device 1 can be adapted to allow each stick to create a different sound when struck against the same material. Steps 2-4 as described above would be repeated for each of the two drumsticks, and the signals sent to the controlling sub program 8 in steps 2 and 8 are adapted to be identifiable as having emanating from the first or the second drum stick.

Further, the device 1 can be enhanced by providing the controlling sub program 8 with the ability to distinguish a pre-determined characteristic of the electric signal sent from the sticks 2. Each time a stick 2 is struck against a material the signal will not be identical. However, there may be a clear characteristic of the signal which can be readily identified inside given tolerances, as having been generated when a one material, and not another, has been struck. It will be appreciated that the pre-determined characteristic and the given tolerances could be any number of things, and these will be pre-programmed into the device 1.

In addition, once an electric signal is recognised as having been generated when a particular material has been struck, the controlling sub program 8 can be adapted to alter various characteristics of any MIDI signal generated in relation to the signal received. For example, if the electric signal is weak the controlling sub program 8 can generate a low volume MIDI signal and so on. Further, if signals are created one after the other quickly, the controlling sub program 8 can merge the MIDI signals created to form a portamento effect—for example a drum roll.

It will be appreciated that the device 1 can be used with other equipment which can recognise a MIDI or audio signal as emitted via the output jack 19. For example, the unit 5 could be connected to another amplifier and speaker or recording mechanism via the jack 19.

In an alternative embodiment (not shown) the piezoelectric strips 3 are replaced with a retro-fitted externally mounted strip which can be fitted to an existing pair of drum sticks.

In a further alternative embodiment the device can be provided with proximity measuring equipment which could be utilised to recognise the exact location of one or other of the drum stick in relation to a given point. This could be used to alter the sounds or MIDI signals created or recorded depending on whereabouts on a particular material the drum stick was struck. With such an arrangement the device could alter a drum sound created or recorded to correspond to the sounds which would be made if a real drum were struck in the centre or at the edge. The proximity measuring equipment could be any known mechanism, for example an electrostatic or magnetic field can be generated in a region of interest, and the field can be detected by the drumstick. A coil could be incorporated into the body of the drumstick to detect the field, and this information would be relayed to the controlling sub program 8, to be included into the way the MIDI signals are created.

It will be appreciated that a device similar to device 1 described above can be used for a number of alternative purposes. In one alternative embodiment (not shown) a device is substantially similar in construction to device 1, except the drum sticks are replaced with a tapping hammer, and the computer unit is adapted to display a resonance and/or vibration signal reading instead of creating and emitting a sound. With this arrangement the tapping hammer can be struck against a surface, and information about the surface can be revealed in the resonance and/or vibration signal itself, or via access to a database. Therefore the density of a wall, or other structure, can be checked, or a component of the wall, for example a concrete layer, can be checked for its condition.

Thus an automatic drum machine is provided which utilizes preferred real drum sticks, but does not require transducer sensors or the like to be struck. The device can be readily transported, and music created with any materials which come to hand.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A device for determining characteristics of subject materials, comprising:

an elongate striking member adapted to strike subject materials in use, vibration measuring means and processing means, in which the vibration measuring means records vibration of the elongate striking member caused by its striking of subject materials in use, and the processing means is adapted to identify pre-determined characteristics of subject materials struck in use from the recorded vibration measurement taken from the elongate striking member.

2. The device as claimed in claim 1 in which the processing means is provided with a database of measurements, and in which the processing means is adapted to identify a pre-determined characteristic of the material struck in use by comparing the recorded measurement taken in use with measurements stored in the database.

3. The device as claimed in claim 2 in which the processing means is adapted to be able to store recorded measurements taken in use in the database, such that subsequent recorded measurements taken in use can be compared with them.

4. The device as claimed in claim 2 or 3 in which the processing means is adapted to identify a pre-determined physical characteristic of the material struck from the recorded measurement taken in use.

5. The device as claimed in claim 2 or 3 in which the processing means is adapted to match the recorded measurement taken in use with a recorded measurement stored in the database.

6. The device as claimed in claim 5 in which the processing means is adapted to match one or more pre-determined characteristics of the recorded measurement taken in use with the corresponding one or more pre-determined characteristics of a recorded measurement stored in the database.

7. The device as claimed in claim 6 in which the processing means is adapted to find a match if the one or more pre-determined characteristics of the recorded measurement taken in use are within a pre-determined tolerance range of the corresponding one or more pre-determined characteristics of a recorded measurement stored in the database.

8. The device as claimed in claim 7 in which the processing means is provided with MIDI signal creation means, and in which a pre-determined MIDI signal is created when the processing means finds a match in use.

9. The device as claimed in claim 8 in which one or more pre-determined characteristics of the MIDI signal created are determined by the location of the one or more pre-determined characteristics of the recorded measurement taken in use within said pre-determined tolerance range.

10. The device as claimed in claim 9 in which the device is provided with means to record one or a sequence of MIDI signals created in use, and/or means to convert one or a sequence of MIDI signals created in use into an audio signal, and to relay and/or record the MIDI and/or audio signal.

11. The device as claimed in claim 5 in which the elongate striking member is a drum stick or a pair of drumsticks.

12. The device as claimed in claim 11 in which the vibration measuring means is one or more elongate strips of piezoelectric quartz crystal in contact with the drum stick, or each of the pair of drum sticks, and in which the recorded measurement taken in use is an electric signal created by the piezoelectric quartz crystal when the drum stick or one of the drum sticks strikes a material in use and resonates and/or vibrates.

13. The device as claimed in claim 12 in which the one or more elongate strips of piezoelectric quartz crystal are mounted inside the shaft of the drum stick, or each of the pair of drum sticks.

14. The device as claimed in claim 13 in the one or more elongate strips of piezoelectric quartz crystal are connected to the processing means by electric signal wires.

15. The device as claimed in claim 1 in which the processing means is a computer program run on a computer and in which the computer program comprises a controlling sub program, a resonance and/or vibration measurement database, a MIDI signal database and a MIDI signal generation sub program.

16. The device according to claim 15 in which the device is provided with proximity measuring means adapted to identify the location of the drum stick or one of the drum sticks, in relation to a pre-determined point in space, and in which one or more of the pre-determined characteristics of the MIDI signal created in use are determined by the location of the drum stick or one of the drum sticks in relation to the pre-determined point when they strike the material.

17. A vibration measurement device comprising vibration measuring means adapted to be fitted to an elongate striking member with which the device is to be used, and processing means, in which the vibration measuring means records vibration of the elongate striking member with which it is used caused by the striking of a material in use, and the processing means is adapted to identify a pre-determined characteristic of the struck material from the recorded vibration measurement.

18. A method of using a vibration measurement device with a vibrating elongate striking member comprising:

(1) striking a material with the elongate striking member, causing the elongate striking member to vibrate such that a recorded measurement is taken from the elongate striking member by the vibration measuring means;

(2) storing the recorded measurement or one or more pre-determined characteristics of the recorded measurement, in the database;

(3) determining a MIDI signal to be associated with the material struck in step (1);

(4) repeating steps (1) to (3) a desired number of times with different materials, until a desired number of recorded measurements are stored in the database;

(5) striking any of the different materials struck with the elongate striking member during the performance of a step (1), causing the elongate striking member to vibrate such that a recorded measurement is taken by the vibration measuring means;

(6) referring the recorded measurement taken in step (5) to those stored in the database in step (2) to find a match; and (7) creating the MIDI signal determined in step (3), according to the match made in step (6).

19. The method according to claim 18 in which the elongate striking member comprises two drum sticks, and steps (1)-(4) are repeated separately for each drum stick, and in which the processing means is adapted to differentiate between the recorded measurements taken by each of the drum sticks in use.

* * * * *